United States Patent [19]
Okuda

[11] Patent Number: 5,337,239
[45] Date of Patent: Aug. 9, 1994

[54] AUTOMATIC TRANSMISSION CONTROL SYSTEM

[75] Inventor: Tsunehisa Okuda, Hiroshima, Japan

[73] Assignee: Mazda Motor Corporation, Hiroshima, Japan

[21] Appl. No.: 122,170

[22] Filed: Sep. 17, 1993

Related U.S. Application Data

[63] Continuation of Ser. No. 721,323, Jul. 1, 1991, abandoned.

[30] Foreign Application Priority Data

Jun. 30, 1990 [JP] Japan .................................. 2-173252

[51] Int. Cl.$^5$ ...................... F16D 43/22; G06F 15/50; G06G 7/70
[52] U.S. Cl. ................... 364/424.1; 477/110; 477/111; 477/120; 477/154; 477/155; 477/160

[56] References Cited

U.S. PATENT DOCUMENTS

| | | | |
|---|---|---|---|
| 4,669,335 | 6/1987 | Matsuoka et al. | 74/866 |
| 4,919,097 | 4/1990 | Mitui et al. | 123/399 |
| 4,942,530 | 7/1990 | Boda et al. | 364/424.1 |
| 4,945,482 | 7/1990 | Nishikawa et al. | 364/424.1 |
| 4,955,259 | 9/1990 | Narita | 74/866 |
| 5,048,374 | 9/1991 | Miyake et al. | 364/424.1 |
| 5,082,097 | 1/1992 | Goeckner et al. | 192/0.032 |
| 5,115,695 | 5/1992 | Wakahara et al. | 74/868 |
| 5,140,871 | 8/1992 | Goto et al. | 364/424.1 |

FOREIGN PATENT DOCUMENTS 57-8983   2/1982  Japan .
57-184755 11/1982 Japan .

*Primary Examiner*—Thomas G. Black
*Assistant Examiner*—Jacques Harold Louis-Jacques
*Attorney, Agent, or Firm*—Keck, Mahin & Cate

[57] ABSTRACT

A particular engine control system is used with an engine equipped with an automatic transmission. The automatic transmission is changeable between an economy operation mode, in which the automatic transmission is placed more frequently in higher gears so as to create a travel mode giving priority to fuel economy, and a power operation mode, in which the automatic transmission is placed more frequently in lower gears so as to create a travel mode giving priority to powerful running. The system controls the engine so as to provide a gentle increase in engine output in the economy mode.

4 Claims, 6 Drawing Sheets

AUTOMATIC TRANSMISSION CONTROL SYSTEM

This is a continuation of application Ser. No. 07/721,323, filed Jul. 1, 1991, now abandoned.

The present invention relates to a control system for an automatic transmission for an automobile.

BACKGROUND OF THE INVENTION

1. Field of the Invention

An automatic transmission typically performs speed shift control according to a previously established shift pattern. The speed shift pattern, in the case of an automatic transmission used in an automotive vehicle, is typically established using engine load and vehicle speeds as parameters. Generally, a plurality of different speed shift patterns are provided. For instance, in the case of two speed shift patterns, one shift pattern is used in an economy operation mode and the other is used in a power operation mode. Speed shifting is made at vehicle speeds which are higher in the power operation mode than in the economy operation mode. These operation modes of the automatic transmission are selectively used by a driver.

2. Description of Related Art

One such automatic transmission has already been reduced to practice and is known from Japanese Unexamined Patent Publication 57-184755. In the automatic transmission described in this publication, when the speed shift pattern for an economy operation mode is selected, the automatic transmission is operated more frequently in higher gears so as to create a travel mode giving priority to fuel economy. On the other hand, when the power operation mode is selected, the automatic transmission is operated more frequently in lower gears so as to create a travel mode giving priority to powerful running.

Some automatic transmissions of this kind automatically select the economy mode and the power mode according to vehicle running conditions. One such transmission is known from, for instance, Japanese Patent Publication 57-8,983. Such an automatic transmission can automatically place the automobile in the fuel economy weighted travel mode or the power weighted travel mode according to vehicle running conditions.

Automatic transmissions are typically equipped with associated frictional elements or mechanisms which include a clutch and a brake which are frictionally locked and unlocked so as to place the automatic transmission into a desired speed gear. Locking and unlocking the frictional elements is managed by line pressure, which is supplied to and relieved from hydraulic actuators. Accordingly, if the line pressure, governing the frictional locking force of the frictional element, is insufficient, a slippage of the frictional elements will occur.

For this reason, the line pressure is typically established by taking into consideration a change of engine torque caused, in a transitional state of the automatic transmission, during an acceleration of the automobile. Because the engine changes torque greatly during acceleration, and a frictional force required to lock the frictional element is large, the line pressure is designed so as to generate a frictional force which is sufficiently high to lock the frictional element during the transitional state. However, since the change in engine torque is small during steady travel, a line pressure determined in this way may be unnecessarily high for the frictional elements.

SUMMARY OF THE INVENTION

It is a primary object of the present invention to provide an engine control system for an engine with an automatic transmission which regulates frictional force required to lock frictional elements of the automatic transmission according to traveling conditions of the vehicle.

According to the present invention, the engine control system, used with an engine equipped with an automatic transmission which is changeable between an economy operation mode, wherein the automatic transmission is placed more frequently in higher gears so as to create a travel mode giving weight, or priority, to fuel economy, and a power operation mode, wherein the automatic transmission is placed more frequently in lower gears so as to create a travel mode giving weight to powerful running, controls the engine so that it provides a gentle increase in engine output in the economy mode. As a result, the automatic transmission requires a low frictional force to frictionally lock its frictional elements while the automobile is in a transitional traveling condition, such as acceleration, so that a working hydraulic pressure is lowered for the operation of the automatic transmission in the economy mode.

Since, in the economy mode, even though the accelerator pedal is depressed comparatively quickly, the working pressure can be made low without assuming such a quick depression of the accelerator pedal.

BRIEF DESCRIPTION OF THE DRAWINGS

The above and other objects and features of the present invention will be apparent to those skilled in the art from the following description of a preferred embodiment thereof when considered in conjunction with the accompanying drawings, in which.

DETAILED DESCRIPTION OF THE PREFERRED EMBODIMENT

Figure 1:
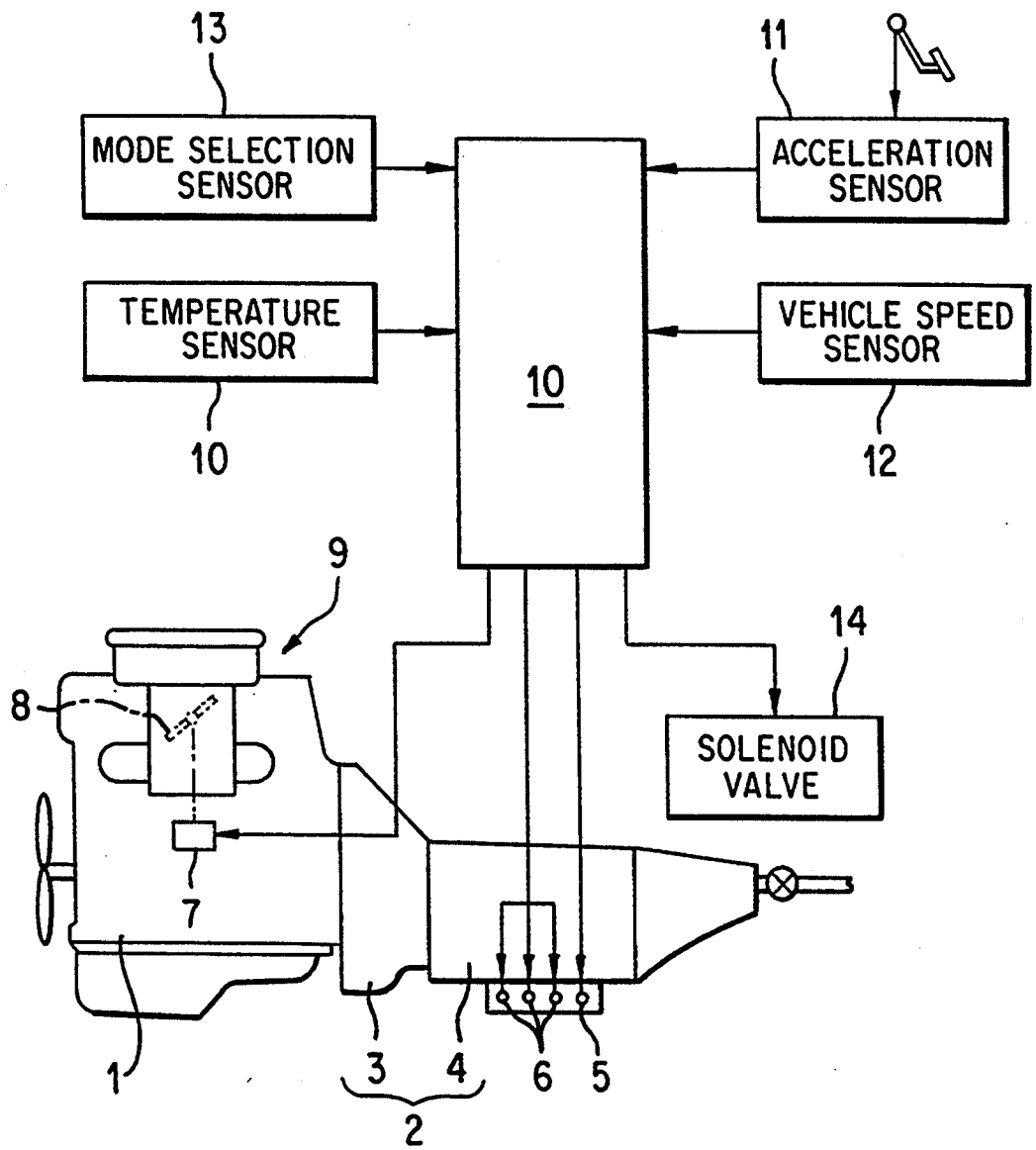
FIG. 1 is a schematic illustration of an engine equipped with an automatic transmission which is controlled by an engine control system in accordance with a preferred embodiment of the present invention.

Referring to the drawings in detail and, in particular, to FIG. 1, shown is an engine 1, equipped with an automatic transmission 2 and controlled by a control unit 10, forming an engine control system in accordance with a preferred embodiment of the present invention. The engine output is transmitted from the engine 1 to drive wheels (not shown) through a well known power train (not shown) via the automatic transmission 2.

Automatic transmission 2, which may be of any known type, comprises a torque converter 3 and a planetary type of multi-stage shift gearset 4. The torque converter 3 has a lock-up clutch (not shown) operated by lock-up solenoid 5 between a lock-up (ON) state and an unlock or released (OFF) state. The shift gearset 4, which has, in this embodiment, four forward shift gears, is placed in any desired gear by combinations of energization and deenergization of shift solenoids 6 created in a well known manner. Because the solenoids 5 and 6, which... operate hydraulic actuators for governing the lock-up clutch and shift gears, are well known in operation and structure, they are not described herein.

Figure 2:
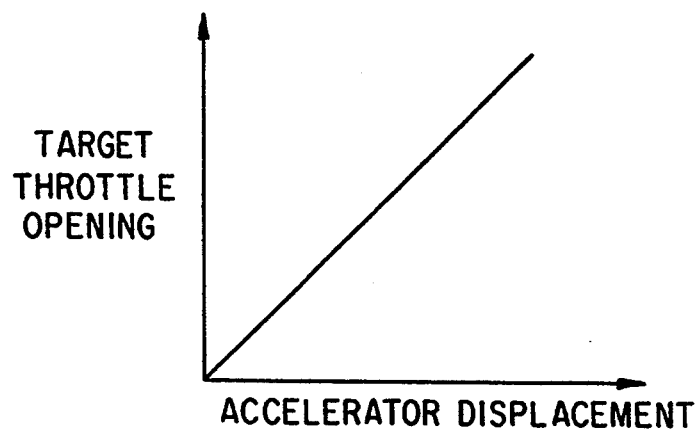
FIG. 2 is a diagram showing a throttle opening setting map.

Control unit 10, comprising a general purpose microcomputer, receives signals from various sensors and switches, such as an acceleration sensor 11 for detecting the displacement of an accelerator pedal, vehicle speed sensor 12, and a mode selection switch 13 for selecting operation modes of the automatic transmission, such as an economy mode and a power mode, which are described in detail later. These sensors and switches may be of any type well known in the automobile art. The control unit 10 provides control signals based on the received signals for actuating the solenoids 5 and 6 and a throttle actuator 7. The throttle actuator 7 controls a throttle valve 8 located in an air intake system 9 of the engine 1, and causes it to open to an opening proportional to the displacement of the accelerator pedal as shown in FIG. 2. The control unit 10, based on the received signals, provides a control signal to a duty solenoid valve 14, which regulates the line pressure for the automatic transmission in a well known manner.

Figure 5:
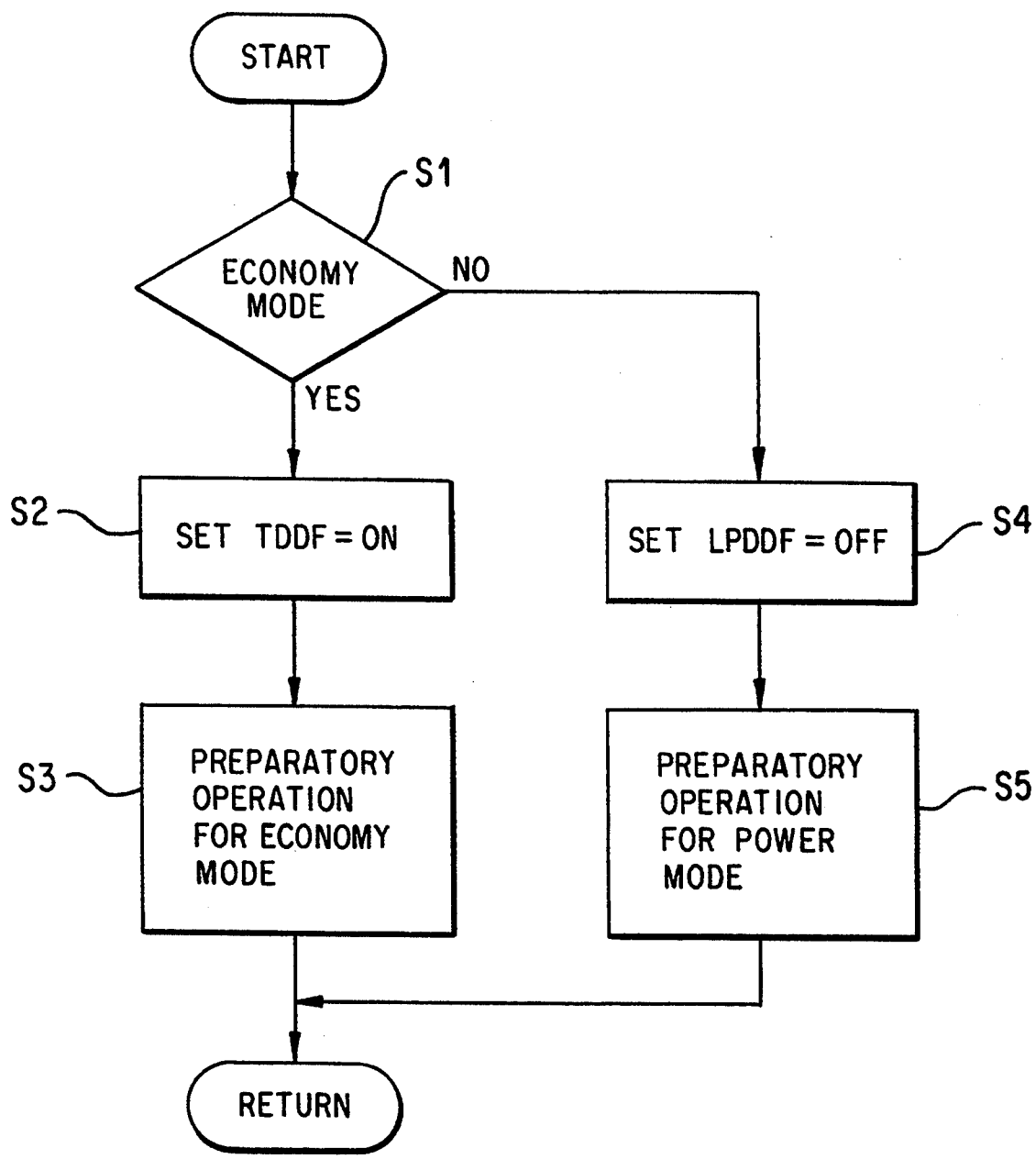
FIG. 5 is a flow chart illustrating a mode selection interrupt routine.
Figure 6:
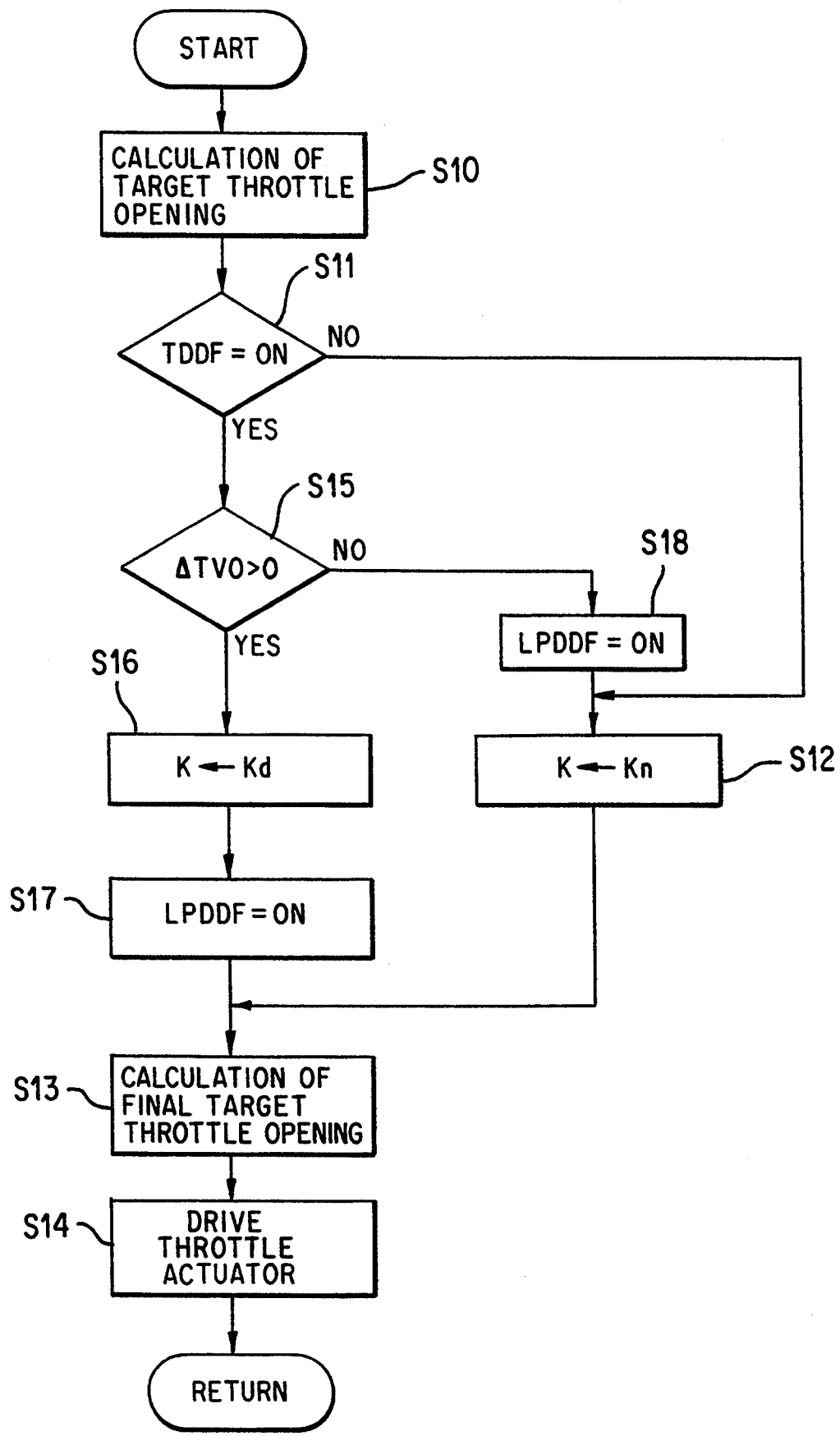
FIG. 6 is a flow chart illustrating a throttle valve control routine.
Figure 7:
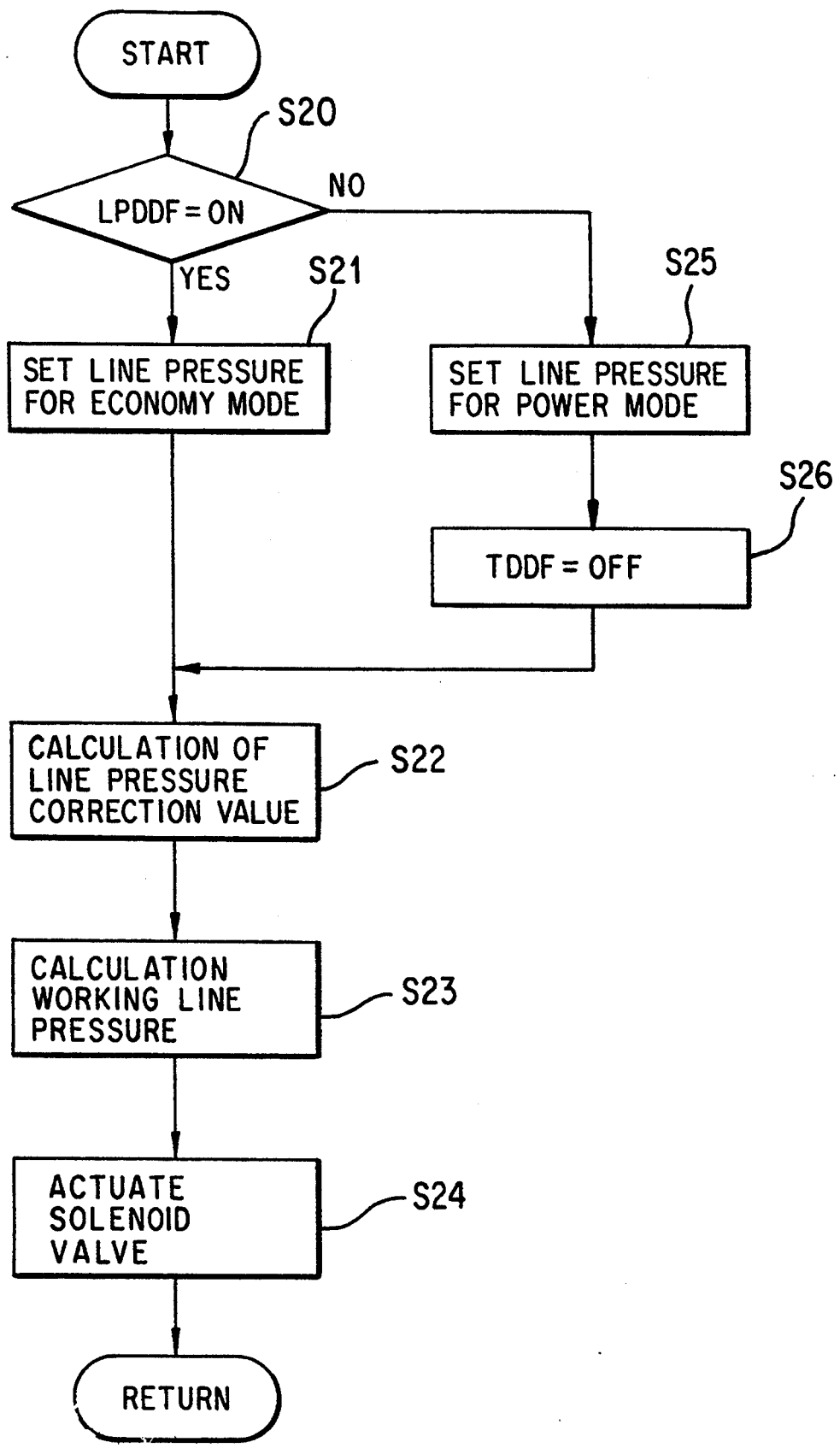
FIG. 7 is a flow chart illustrating a line pressure control routine.

The operation of the engine depicted in FIG. 1, controlled by the engine control system, is best understood by reviewing FIGS. 5–7, which illustrate various routines for the microcomputer of the control unit 10. Programming a computer is a skill well understood in the art. The following description is written to enable a programmer having ordinary skill in the art to prepare an appropriate program for the microcomputer. The particular details of any such program would, of course, depend upon the architecture of the particular computer selected.

Control unit 10, basically comprising a CPU, ROM, RAM, and CLOCK (software timer), is also provided with A/D and D/A converters and input and output interfaces.

Figure 3:
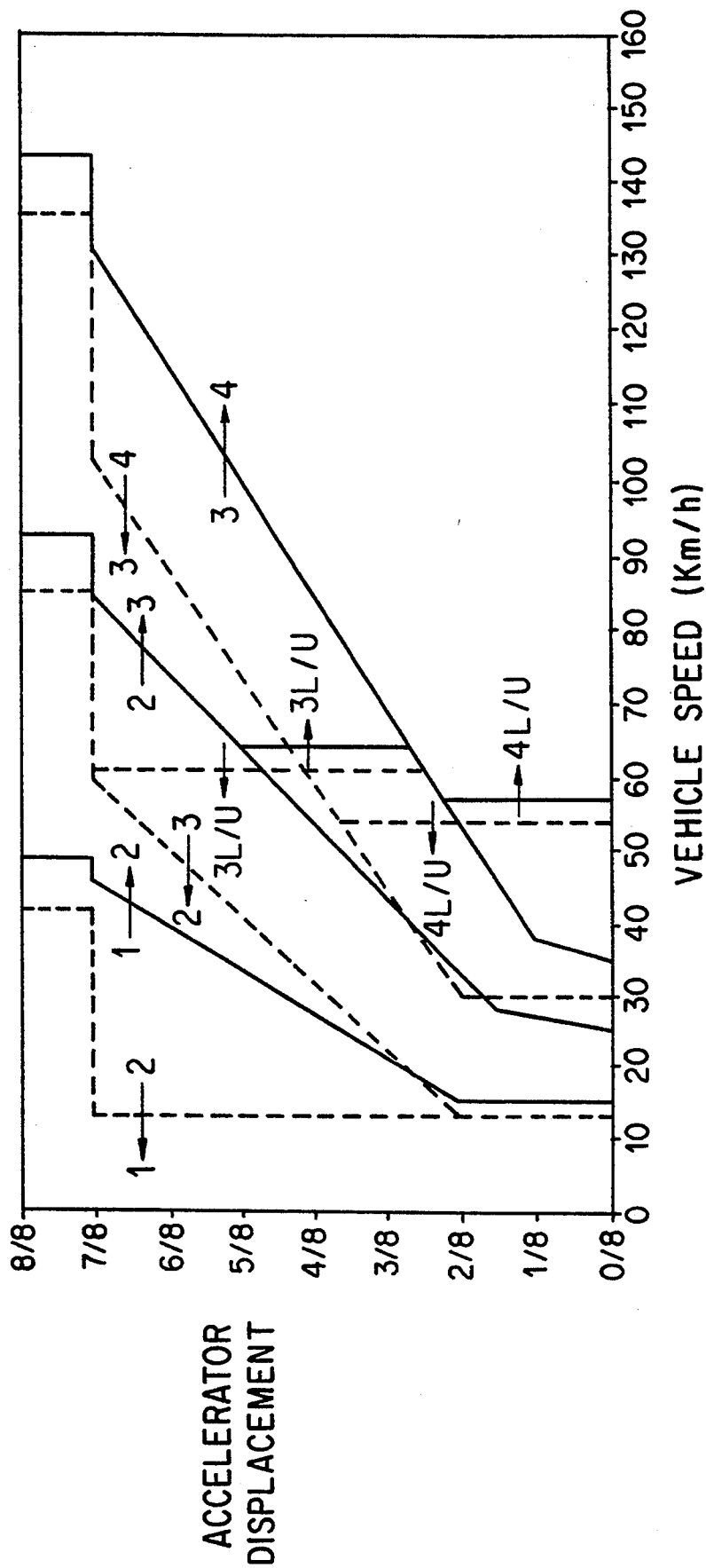
FIG. 3 is a map of speed shift pattern in the economy mode.
Figure 4:
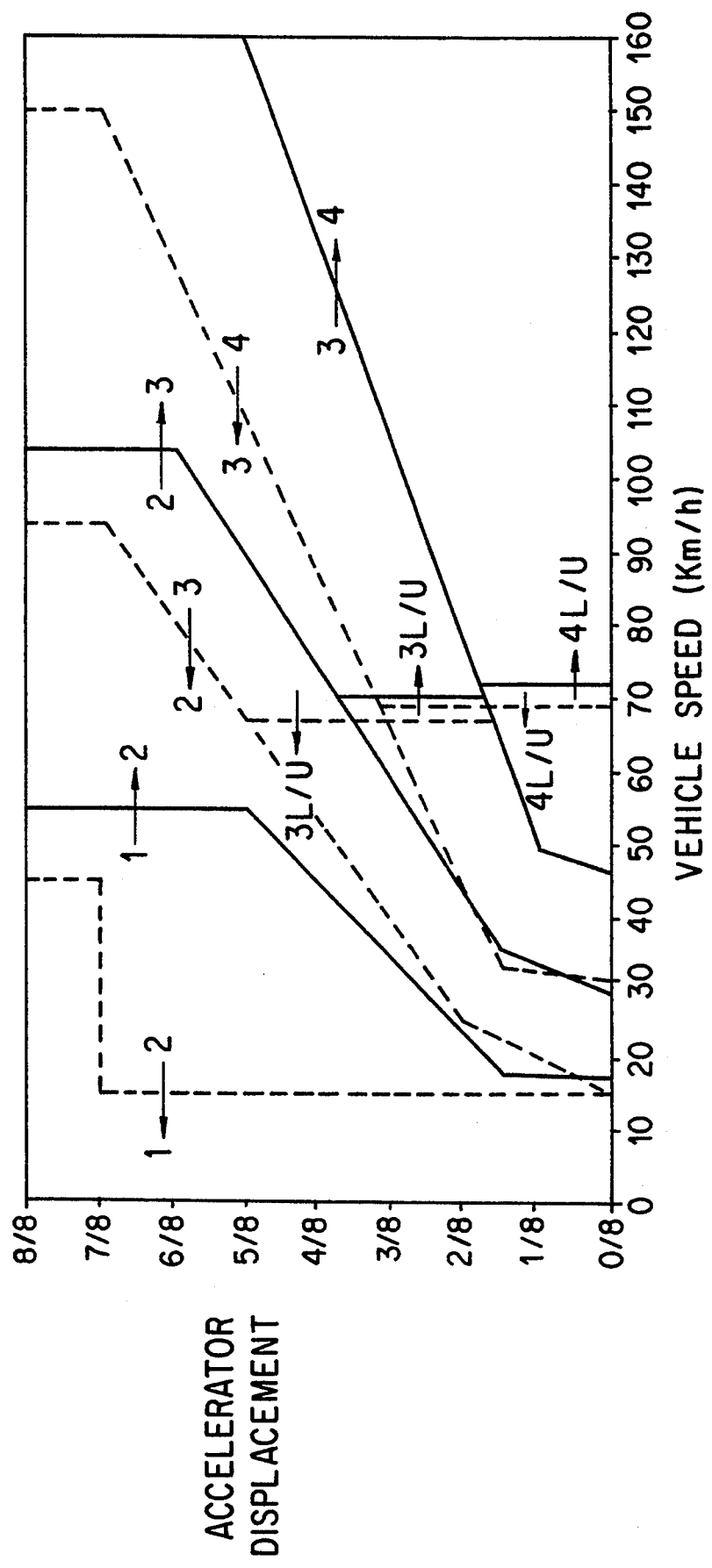
FIG. 4 is a map of speed shift pattern in the power mode.

Data representative of transmission shift patterns for an economy mode and a power mode and a data map representative of throttle openings are stored in the ROM of the microcomputer of the control unit 10. The transmission shift pattern has parameters of vehicle speed and engine load as represented by acceleration pedal displacement. FIGS. 3 and 4 show the transmission shift patterns for economy mode and power mode, respectively. As is apparent from these transmission shift patterns, speed shifts in the power mode are conducted at vehicle speeds higher than vehicle speeds at which speed shifts in the economy mode are conducted.

Mode Selection Switch Interrupt Routine

The interrupt routine, depicted as a flow chart in FIG. 5, operates to suspend the ongoing basic engine control routine and is called for whenever the mode selection switch 13 is operated.

In the interrupt routine, the first step in step S1 is to decide if a selected mode is the economy mode. If in fact the economy mode is selected, after setting a throttle delay decision flag (TDDF) to a decision state (TDDF = ON) in step S2, preparatory operations, including reading out the data of the transmission shaft pattern for the economy mode shown in FIG. 3, are carried out in step S3. On the other hand, if the answer to the decision in step S1 is no, this indicates that the power mode is selected. After resetting a line pressure drop decision flag (LPDDF) to a non-decision state (LPDDF = OFF) in step S4, preparatory operations, including reading out the data of the transmission shift pattern for the power mode shown in FIG. 4, are carried out in step S5. These decision flags (TDDF) and (LPDDF) will be described later.

Throttle Valve Control Routine

Referring to FIG. 6, which is a flow chart of the throttle valve control routine, the first step in step S10 is to read signals and to calculate a target throttle opening based on a detected accelerator pedal stroke with reference to the data of the throttle opening map shown in FIG. 2. Then, a decision is made in step S11 as to whether the throttle delay decision flag (TDDF) has been set to the decision state (TDDF = ON). If the throttle delay decision flag (TDDF) is not set to the decision state (TDDF = ON), since it is presumed that the power mode has been selected, then, after setting a leveling coefficient K to a value of Kn (Kn = 0) for normal throttle valve control in step S12, a final target opening of the throttle valve 8 is calculated for normal throttle valve control in step S13. Calculation of the final target opening TVO(i) is made from the following equation:

$$TVO(f) = K \times TVO(f-1) + (1-K) \times TVO(i)$$

where

TVO(f) is the throttle opening for the present control;

TVO(f−1) is the throttle opening for the last control;

TVO(i) is the final target throttle opening; and

K is the leveling coefficient ($0 < K < 1$).

According to the result of this calculation, the throttle actuator 7 is driven so as to open the throttle valve 8 to the calculated final target throttle opening TVO(i) in step 14.

Otherwise, if the answer to the decision in step S11 is yes, indicating that the economy mode is selected, a further decision is made in step S15 as to whether the change of throttle opening (Δ TVO) is positive or larger than zero (0), i.e., whether the throttle valve 8 is increasingly opening. If the answer to the decision is yes, the engine is Judged to be under acceleration. In the case of acceleration, the leveling coefficient K is set to a value of Kd ($0 < Kd < 1$) for delayed throttle valve control in step S16. After setting the line pressure drop decision flag (LPDDF) to a decision state (LPDDF =ON) in step S17, a final target opening of the throttle valve 8 is calculated for throttle control in step S13 from the above equation. In the same manner as in the power mode, according to the result of calculation in step S13, the throttle actuator 7 is driven so as to open the throttle valve 8 to the calculated final target throttle opening TVO(i) in steps 14. Because the leveling coefficient K is set between 0 and 1 for the economy mode, the final target throttle opening TVO(i) is smaller for the economy mode than for the power mode in which the leveling coefficient K is 0. Consequently, the throttle valve 8 is driven more slowly in the economy mode than in the power mode, so as to open to the final target throttle opening with a time delay behind the depression of the accelerator pedal.

If the answer to the decision regarding the change of throttle opening (ΔTVO) in step S15 is no, indicating that the change of throttle opening is smaller than zero (0), i.e., that a deceleration is intended, then, after setting the line pressure drop decision flag (LPDDF) to a decision state (LPDDF = ON) in step S18, the leveling coefficient K is set to the value of Kn (Kn = 0) for normal throttle valve control in step S12. Accordingly, when a deceleration is conducted in the economy mode, the throttle valve 8 is driven quickly in response to the speed of depression of the accelerator pedal.

Line Pressure Control Routine

Referring to FIG. 7, which is a flow chart of the line pressure control routine, the first step in step S20 is to make a decision as to whether the line pressure drop decision flag (LPDDF) has been set to a decision state (LPDDF = ON). If the answer to the decision is yes, indicating that the economy mode has been selected, a basic line pressure is set for the economy mode in step S21. The basic line pressure for the economy mode is predetermined so as to be sufficient for the automatic transmission to generate and maintain a friction force required to lock the frictional elements under normal vehicle travel conditions. This basic line pressure is smaller than a basic line pressure for the power mode which will be described later. After calculating a correction pressure for the basic line pressure, based on the temperature of working oil in the automatic transmission 2, in step S22, a calculation is carried out to obtain a working line pressure by adding the correction pressure to the basic line pressure in step S23. The solenoid valve 14 is driven with the working line pressure in step S24.

If the answer to the decision regarding the line pressure drop decision flag (LPDDF) in step S20 is no, indicating that the power mode has been selected, then, a basic line pressure is set for the power mode in step S25. After resetting the throttle delay decision flag (TDDF) to a non-decision state (TDDF = OFF) in step S26, the solenoid valve 14 is driven in step S24 with a working line pressure obtained through steps S22 and S23. The basic line pressure for the power mode is predetermined so as to be sufficient for the automatic transmission to generate and maintain a friction force required to lock the frictional elements under transitional vehicle travel conditions.

As is apparent from the above, through the line pressure control steps, the working line pressure of the automatic transition 2 is regulated so as to be relatively low for the economy mode and relatively high for the power mode.

As is clear from the above description, according to the engine control system of the present invention, in the economy mode, in which the automobile travels comparatively gently, the working line pressure of the automatic transmission 4 is lowered, so as to provide a suitable frictional force for the automatic transmission and to improve fuel economy, which is one of the advantages of the economy mode.

It is to be understood that although the present invention has been described with respect to a preferred embodiment thereof, various other embodiments and variants may be apparent to those skilled in the art. Such other embodiments and variants, which fall within the scope and spirit of the invention, are intended to be covered by the following claims.

What is claimed is:

1. An engine control system for an engine equipped with an automatic transmission having hydraulically operated frictional coupling means for transmitting engine output, said automatic transmission being operative in an economy operation mode, wherein said automatic transmission is placed more frequently in higher speed gears, and in a power operation mode, wherein said automatic transmission is placed more frequently in lower speed gears, said engine control system comprising:

mode detection means for detecting when said automatic transmission is set in said economy operation mode;

pressure regulating means for regulating hydraulic pressure actuating said automatic transmission; and control means for causing said pressure regulating means to make said hydraulic pressure lower when said mode detection means detects said automatic transmission is set in said economy operation mode than when said mode detection means detects said automatic transmission is set in said power operation mode.

2. An engine control system for an engine equipped with an automatic transmission having hydraulically operated frictional coupling means for transmitting engine output, said automatic transmission being operative in an economy operation mode, wherein said automatic transmission is placed more frequently in higher speed gears, and in a power operation mode, wherein said automatic transmission is placed more frequently in lower speed gears, said engine control system comprising:

mode detection means for detecting when said automatic transmission is set in said economy operation mode;

pressure regulating means for regulating hydraulic pressure actuating said automatic transmission;

pressure control means for causing said pressure regulating means to regulate said hydraulic pressure so that it is lower when said mode detection means detects said automatic transmission is set in said economy operation mode than when said mode detection means detects said automatic transmission is set in said power operation mode;

acceleration detection means for detecting an acceleration rate of said engine;

output regulation means for regulating a rate of increase of said engine output; and output control means for changing said rate of increase of said engine output according to said acceleration rate so that it is smaller when said mode detection means detects said automatic transmission is set in said economy operation mode than when said mode detection means detects said automatic transmission is set in said power operation mode.

3. An engine control system for an engine equipped with an automatic transmission having hydraulically operated frictional coupling means for transmitting engine output, said automatic transmission being operative in an economy operation mode, wherein said automatic transmission is placed more frequently in higher speed gears, and in a power operation mode, wherein said automatic transmission is placed more frequently in lower speed gears, said engine control system comprising:

mode detection means for detecting when said automatic transmission is set in said economy operation mode;
acceleration detection means for detecting an acceleration rate of said engine;
output regulation means for regulating a rate of increase of said engine output;
pressure regulating means for regulating hydraulic pressure actuating said automatic transmission;
control means for making said rate of increase of said engine output according to said acceleration rate smaller when said mode detection means detects said automatic transmission is set in said economy operation mode than when said mode detection means detects said automatic transmission is set in said power operation mode; and
control means for causing said pressure regulating means to make said hydraulic pressure lower when said mode detection means detects said automatic transmission is set in said economy operation mode than when said mode detection means detects said automatic transmission is set in said power operation mode.

4. An engine control system as recited in claim 3, wherein said acceleration detection means comprises means for detecting a displacement of an accelerator pedal.

* * * * *